W. C. GREENE.
ASTIGMATIC LENS.
APPLICATION FILED APR. 26, 1919.

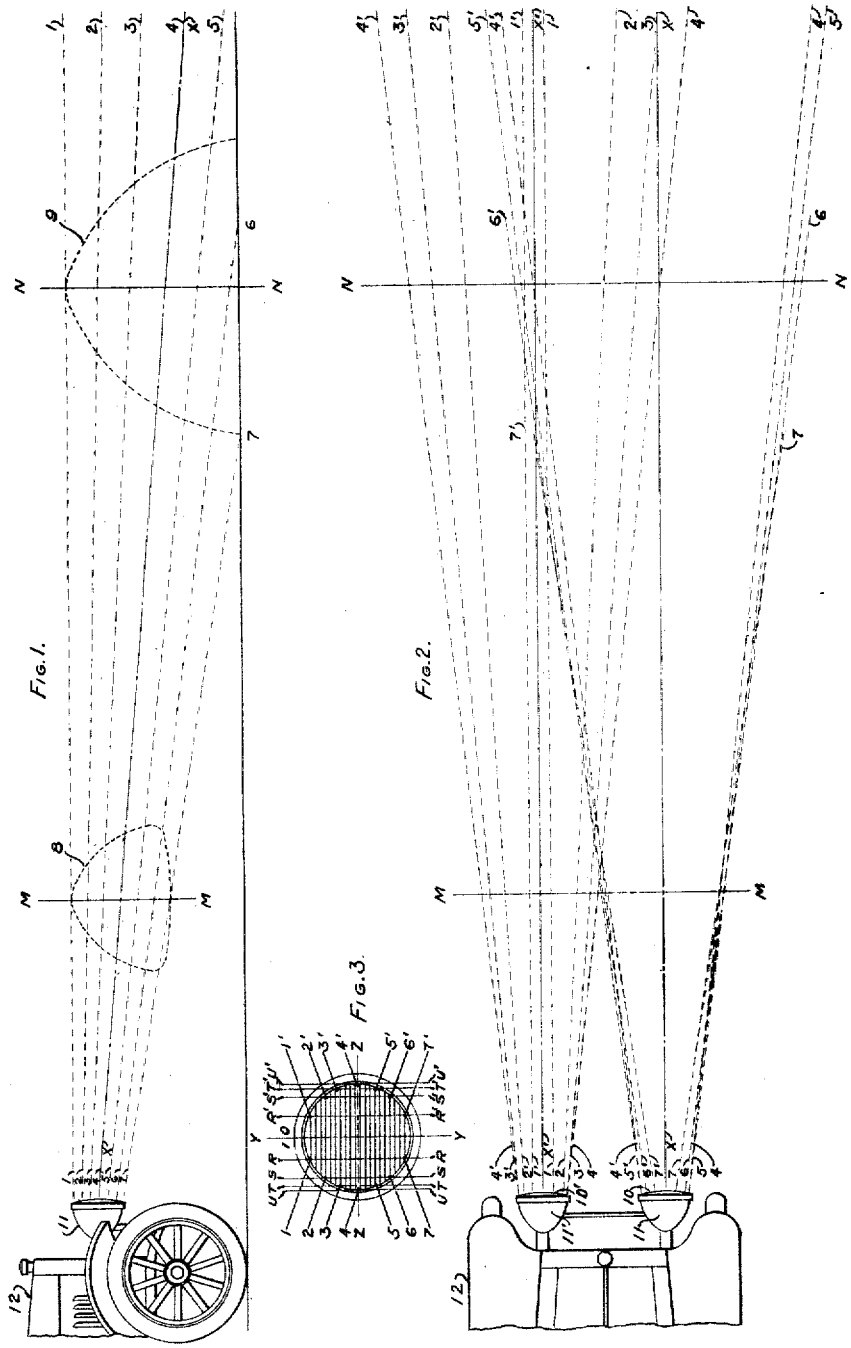

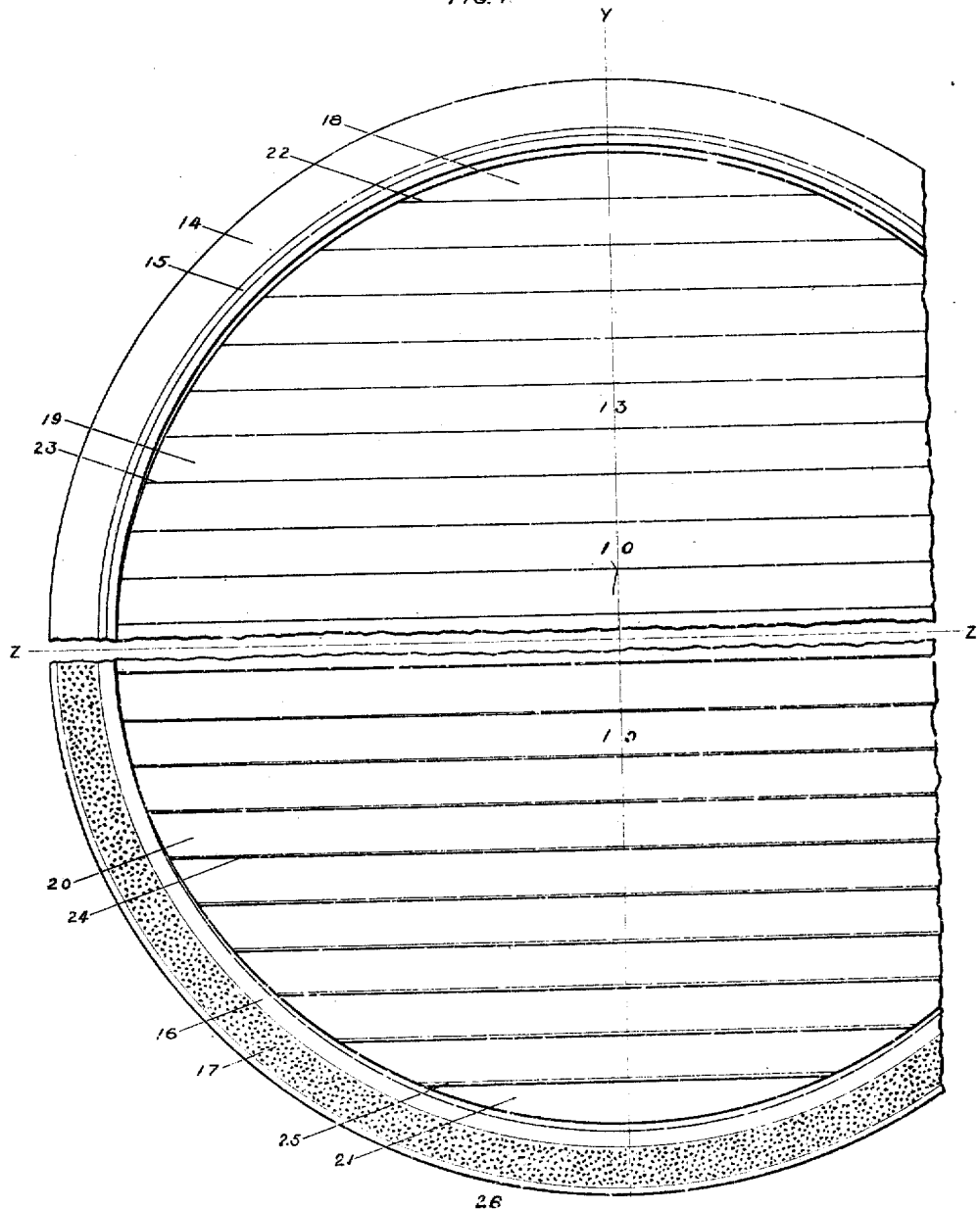

1,367,960.

Patented Feb. 8, 1921.
3 SHEETS—SHEET 3.

INVENTOR:
WILLARD C GREENE
by his attorneys
Gifford + Bull

UNITED STATES PATENT OFFICE.

WILLARD C. GREENE, OF EAST ORANGE, NEW JERSEY.

ASTIGMATIC LENS.

1,367,960.   Specification of Letters Patent.   Patented Feb. 8, 1921.

Application filed April 26, 1919. Serial No. 292,985.

*To all whom it may concern:*

Be it known that I, WILLARD C. GREENE, a citizen of the United States, residing at East Orange, in the county of Essex and State of New Jersey, have invented certain new and useful Improvements in Astigmatic Lenses, of which the following is a specification.

My present invention relates to astigmatic lenticular systems, particularly such as are used on automotive vehicles and the like, for illuminating the highway within a prescribed area so that the driver of the vehicle may have the approaching surface of traverse extendedly and adequately illuminated, while at the same time the projected light beam is limited and controlled from disturbing the vision of drivers of approaching vehicles and likewise the vision of pedestrians.

One of the objects of my invention is to provide a head lamp and an astigmatic lenticular system therefor, which will project a beam of novel cross-section and produce a positive, efficient illumination of the highway while also effectively keeping the intense projected light beam below a level at any distance at which it will cause visual annoyance to drivers of other vehicles and to pedestrians.

Another object of my invention is to produce a multi-refractive and multi-focal lens for a head-lamp which will so refract the rays reflected from the optical mirror of the head-light system as to produce a certain desired illumination of the highway and which at the same time, may be manufactured by pressing in molds with little or no tendency to produce surface distortions which commonly result from excessive warpage and shrinkage produced in the pressing and annealing operations in the making of many pressed glass articles.

With these and other objects in view, my invention consists of certain novel features of construction, combination and arrangement of parts as will be more fully described and pointed out in the appended claims.

A compound or multi-focal lens possessing the properties just described may be preferably constructed as a unit optical part and may represent the homogeneous union of a single plano-spherical element of horizontal axis with a plurality of plano-conical, or plano-conoidal elements of vertical axes. Such construction is optically characteristic of a single optical element having one refracting surface of constant focal length and axial placement, and the other refracting surface of varying focal length with varied axial placement.

Figure 6:
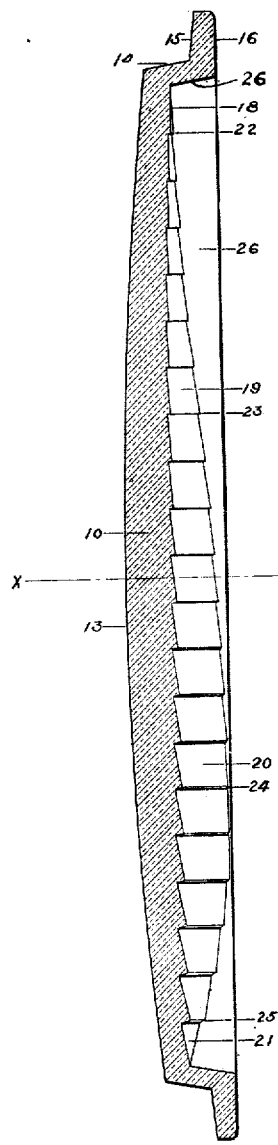
Figure 7:
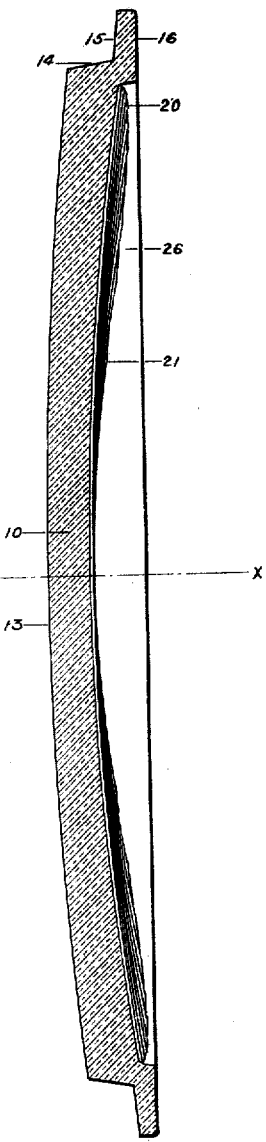

In the drawings, Figure 1 represents a diagrammatic side elevation of a motor vehicle with a head-lamp provided with my novel optical system, showing the character of a light beam which the astigmatic optical system will project when assembled in certain optical relations; Fig. 2 is a plan view similar to Fig. 1; Fig. 3 is a diagrammatic front elevation of my novel multi-focal lens with points and planes marked thereon by which the diagrams of Figs. 1 and 2 were obtained; Fig. 4 is a fragmental, front elevation of the upper half of a multi-focal lens which I have adopted for purpose of illustration; Fig. 5 is a fragmental, rear elevation of the lower half of the multi-focal lens shown in Fig. 4; Fig. 6 is a section in the transverse, vertical, median plane Y—Y of the multi-focal lens, as shown in Fig. 3, and Fig. 7 is a section in the transverse, horizontal, median plane Z—Z of the multi-focal lens looking downward from the center of the lens.

Corresponding parts are referred to in the specifications and in the drawings by similar reference characters.

Referring first to my illustrative form of lens which is shown in Figs. 3 to 7 inclusive, the multi-focal lens 10, as is usual in such construction for head-lamps having paraboloidal mirrors, is circular in outline and is provided with an anterior annular, flange surface 15 and a posterior annular, flange surface 16, by which it may be held in the head-lamp in correct relation with the light source, with the reflector and in correct placement. As in similar constructions in the art, one or both flange surfaces, or annular spaces, when the lens is made circular, may be roughened as at 17 to increase the holding contact with other parts and prevent an undesired rotation of the lens.

The anterior refracting surface 13, is joined to the front flanged surface or annular space by a continuous, mitered, conical surface 14, of minimum measurement to effect a reduction in thickness of the combined optical elements. The mitered, conical surface also serves both as a locating and as a contacting surface with the head-lamp bevel edge.

The front face or anterior refracting surface 13, of the multi-focal lens 10, in the illustrated form, is continuous and spherically convex in contour, and therefore refracting through all planes. I have found that the radius of this spherical surface may be varied within considerable limits and still enter into the desired optical relations with the radii of the posterior surfaces. The refracting power of the anterior surface is preferably calculated to only slightly modify the refracting power of the multiple posterior surfaces. A symmetrical or an additional refraction by the anterior, convex, spherical surface of all light rays transmitted or refracted by the multiple, concave, posterior surfaces effects certain desired corrections in the light beam formation, thereby further controlling distribution and increasing the uniformity of illumination.

The radius of curvature of the spherical anterior surface may approximate the radii of curvature of certain posterior surfaces, thus reducing the thickness of the combined refracting elements and decreasing the weight and surface distortion. Variations in the construction and refracting power of the anterior surface may be made according to the optical and structural difficulties which a particular problem in illumination may present. For example, a concave anterior refracting surface may be employed to increase the refracting power of the multiple posterior concave refracting surface or the spherical surface may be decentered from the optical axis X—X through certain planes as a compensating element for thickness of parts or as an additional refracting element.

The rear face or posterior refracting surfaces 18, 19, 20, 21 of the multi-focal lens 10, in the illustrative form in Figs. 3 to 7 inclusive is a composite surface formed by a plurality of horizontally arranged, continuous, warped segments and zones of conical surfaces having vertical axes, such as may be made by revolving straight lines around a vertical axis. Such warped refracting surfaces may be either conical or conoidal surface sections of vertical axes and as particularly shown in Figs. 6 and 7 at 18, 19, 20, 21, they are concave segments and symmetrical zones cut from frustums of right circular cones of vertical axes and of various sizes.

Further, the refracting surfaces 18, 19, 20, 21 may in practice be generated by slightly curved or irregular lines without markedly modifying the optical properties of the composite refracting surface or departing from the nature of this invention.

Likewise the height of the different refracting surfaces may be varied in any portion or may be varied in the entire posterior surface according to the refraction requirements.

The multiple warped refracting surfaces are structurally joined together by other surfaces conveniently set at right angles to the faces of the refracting surfaces, and shown in the illustrative form of lens, particularly in Figs. 4, 5, 6 and 7 as the miter surfaces 22, 23, 24 and 25. Geometrically considered, the miter surfaces are approximately circular lunes or portions of the same, with converging curved boundaries. When the posterior refracting surfaces lie in a common plane, the lune shaped surfaces undergo changes in length, width, angular placement, and warping, in a corresponding degree to the changes effected in the refracting surfaces.

Both refracting and miter surfaces are joined to the posterior flange surface 16, by a mitered, conical surface 26, being approximately concentric to the mitered conical surface 14.

The difference in angular values between all posterior refracting surfaces is preferably made to vary coincidently with the changes effected in the mean radius of curvature between all posterior refracting surfaces. Such coincident and progressive variation may follow either entirely or partially a progressive series of a definite mathematical order.

For instance, in the lens illustrated, the posterior refracting surfaces are portions of the surfaces of a series of right, vertical cones having parallel axes, with the radius of the cone forming the surface 18 larger and the apex angle of such cone smaller than the axis and apex angle, respectively, of the cone forming the next surface below, and so on to the bottom of the lens at the surface 21.

In order to avoid interference or fusion of one warped surface with another in the molding operation, and at the same time, to avoid undue thickness of glass, I preferably adopt a minimum miter measurement and so arrange the surfaces from some common plane or surface, so that not only is this minimum miter width maintained, but also a minimum thickness of a part through certain planes. Such an arrangement is shown in my illustrative form, the effect obtained being best shown in Figs. 6 and 7. The anterior refracting surface 13 of the lens is shown spaced laterally from the posterior refracting surface 18, to maintain a minimum miter measurement for the miter surface 22, and the refracting surfaces and miter surfaces intermediate to and including the refracting surface 19 are in compensated placement to maintain a predetermined minimum miter measurement. Without such compensation, the adjacent refracting surfaces might emerge in the pressing operation. Such compensation is obtained, in the form illustrated, by shifting the axes of the cones forming the upper, posterior, refracting surfaces so that such axes are not in alinement but are in the same vertical plane containing the optical axis of the lens.

An optical prismoid, having a concave refracting surface, cut from a solid of revolution having maximum and minimum radii, such as the frustum of a cone, a frustum of a parabolic conoid or frustums of other solids of revolution having maximum and minimum radii with the opposing surface of the section cut plane, will possess the property of simultaneously refracting in two or more right angle placed planes and will be of least thickness in the median vertical plane.

When an optical prismoid having these refracting characteristics undergoes further development with the formation of a plurality of mitered surfaces, which may be made by mitered sections to approximate a continuous, an interval or a composite surface and further has homogeneously affixed upon the plane surface described an additional refracting surface, of spherical or other form, the affixing or union of such surface may add a desirable portion as a compensating or auxiliary refracting surface to the optical prismoid. As for example, considerations of improvements in the reduction of thickness of parts and of weight, increase in mechanical strength, decrease or increase of refracting power in certain portions, increase of uniformity of resultant illumination, decrease in distortion and warpage in the pressing and annealing operations and other considerations according to the particular service to which the optical part is to be adapted, may determine the necessity or desirability of employing a refracting anterior surface.

While it is preferable for service conditions to place the continuous spherical surface exteriorly, the multiple warped surfaces may be used exteriorly without noticeably altering the optical properties of the lens.

Referring now to the character of light beam projected by an optical system embodying my novel multi-focal lens, one form of which has just been described, 12 is the front of an automotive vehicle to which is attached the usual head lamps 11 and 11', each provided with a source of light and a reflector adapted to normally project a light beam having substantially parallel rays.

In the lamp fronts are placed my novel lenses 10 and 10' which so refract the light rays projected from the reflector as to produce a light beam having a cross-section as illustrated by the dotted lines at 8, which is a transverse section through the vertical plane M—M but turned through an arc of 90 degrees to the plane M—M.

It will be seen that this light beam cross-section approximates in general that of an isosceles triangle though the sides are somewhat curved and the angles are not sharply defined. This novel light beam cross-section results from a marked horizontal contraction of the upper sectors, a marked horizontal expansion of the lower sectors, combined with a vertical expansion of a light beam circular in cross section, the intensity of which is made proportionate according to the refracting power of the combined optical elements. The top of this novel light beam is relatively narrow and composed of virtually parallel and horizontal rays. The vertical, horizontal and intermediate plane refraction, produced by the top refracting surface, being the minimum of the multi-focal lens, the light rays at that portion will be projected for the greatest distance with least width, producing maximum ray concentration for maximum projection distance. In a descending relation the light rays are refracted simultaneously downward and outward at increasing angles for the descending refracting surfaces, so that the bottom of the light beam is broad and composed of horizontally depressed and diverging rays.

The vertical, horizontal and intermediate plane refraction as produced by the bottom surface, being the maximum of the multi-focal lens, the light rays at that portion of the beam will be projected for the least distance with greatest width, producing minimum ray concentration for minimum projection distance. Allowing for loss of light intensity due to angular dispersion of light source and distance of projection, a concentrated form of illumination is obtained on the highway distant from the light source and a wide diffused type of illumination obtained adjacent to the source. At the vertical plane N—N, the highway will be illuminated to a width corresponding to the base of the dotted, substantially triangular section shown at 9 to indicate a cross-section of the light beam in a plane N—N, but turned through an angle of 90 degrees, similar to cross-section 8.

Intermediate portions of the light beam represent intermediate degrees of vertical horizontal and intermediate planes of refraction, therefore intermediate distances and widths of light beam projection.

The posterior refracting elements being arranged in a suitable single progressive refractive series as at 18, 19, 20, 21, the uniformity of light distribution projected by the multi-focal lens upon the highway is the resultant of a combined series relationship established between the anterior refracting surface 13 and the posterior refracting surfaces 18, 19, 20, 21, and all intermediate surfaces.

It will be understood that when a pair of lamps is used, the two light beams are partially merged as shown in Fig. 2 and that the total width of highway illuminated is the distance between the two head-lamps, plus the lateral extensions of the light beams intersected by the highway.

In Fig. 3, I have drawn lines R—R, S—S, T—T, U—U and R'—R', S'—S', T'—T', U'—U' and have taken points thereon, 1, 2, 3, 4, 5, 6, 7 and 1', 2', 3', 4', 5', 6', 7', to indicate approximate marginal light rays passing through the lenses 10 and 10', and in Figs. 1 and 2, I have illustrated the direction in the vertical and horizontal planes which each of these marginal light rays will take. For clearness of illustration in Fig. 2, the marginal light rays emerging at points 1, 2, 3, 4 and points 1', 2', 3', 4' are those marginal rays from the upper half of the multi-focal lens being projected by the head-lamp, while those marginal light rays emerging at points 4, 5, 6, 7 and points 4', 5', 6', 7' are those marginal rays from the lower half of an identically similar multi-focal lens represented by dotted lines as being projected from the head-lamp. Axial light rays are coincident with the optical axes X—X and X'—X'.

It will be seen that the construction of my multi-focal lens is such that marginal light rays emerging at points 1 and 1' have the minimum vertical depression with minimum horizontal divergence, whereas the marginal light rays at points 7 and 7' have the maximum vertical depression and maximum horizontal divergence of the rays illustrated. A comparison of marginal light rays emerging at points 2, 2', and at points 6, 6', shows that the emergent light rays at points 2, 2' have less vertical depression and less horizontal divergence than the emergent light rays at points 6, 6'. Likewise a similar difference exists between emergent light rays at points 3, 3' and points 4, 4' or between emergent light rays at points 4, 4' and points 5, 5'.

Any light ray emerging through the vertical plane Y—Y as in Fig. 3, will have a vertical depression only, while light rays emerging through the planes R—R, S—S, T—T, U—U and R'—R', S'—S', T'—T', U'—U' will have both horizontal depression and horizontal divergence. Furthermore, it is evident that the emergent light rays in certain portions of the lens may be refracted in one plane only and in other portions they may be refracted simultaneously through two or more planes. The result of this combination is to cause a desired proportionate distribution of light by which distant objects in the center of the highway will be well illuminated by the more parallel, concentrated portion of the light beam, while the highway near the vehicle will be well illuminated to a considerable distance on either side of the center of the highway by the widely divergent portion of the light beam. The intermediate distances represent a gradual transition from distant, narrow concentrated area of illumination to an adjacent broad diffused area of illumination.

While I have illustrated a specific form of multi-focal lens and an optical system which will produce the results indicated, it will be understood that the construction of the lenses, producing these results, may be varied without departing from my invention.

What I claim and desire to secure by Letters Patent of the United States is:

1. An astigmatic lens, having a face formed of warped surfaces, and an opposed convex face, whereby light is refracted simultaneously in right angled placed planes and through all intermediate radial and other planes.

2. An astigmatic lens, having a face formed of warped, mitered surfaces, and an opposed convex face, whereby light is refracted simultaneously in right angled placed planes and through all intermediate radial and other planes.

3. An astigmatic lens having one face formed by a plurality of warped surfaces equivalent to a surface section of a solid of revolution having maximum and minimum radii and an opposed face equivalent to a surface section of a solid of revolution having equivalent radii.

4. An astigmatic lens, having one face composed of a plurality of warped, mitered surfaces formed by surface sections of cones and an opposed face formed by a surface section of a sphere.

5. An astigmatic lens, having one face composed of a plurality of warped surfaces formed by solids of revolution, having maximum and minimum radii and an opposed face formed by a surface section of a sphere.

6. An astigmatic lens having one face composed of a plurality of warped, mitered surfaces formed by surface sections of cones, joined together by circular lines or portions of the same, and an opposed face formed by a surface section of a sphere.

7. An astigmatic lens having a face formed of a plurality of warped surfaces and an opposed convex face, each of said warped surfaces consisting of a segment of the surface of a cone with the apexes of the cone downward and the apex angles of the cones increasing progressively in successive segments, from the top to the bottom of the lens.

8. An astigmatic lens having a face formed of a plurality of warped surfaces and an opposed convex face, each of said warped surfaces consisting of a segment of the surface of a cone with the apexes of the cone downward and the apex angles of the cones increasing progressively and the radii of the segments decreasing progressively.

WILLARD C. GREENE.

Correction in Letters Patent No. 1,367,960.

It is hereby certified that in Letters Patent No. 1,367,960, granted February 8, 1921, upon the application of Willard C. Greene, of East Orange, New Jersey, for an improvement in "Astigmatic Lenses," an error appears in the printed specification requiring correction as follows: Page 4, line 97, claim 4, strike out the word "mitered"; and that the said Letters Patent should be read with this correction therein that the same may conform to the record of the case in the Patent Office.

Signed and sealed this 22d day of March, A. D., 1921.

[SEAL.]

M. H. COULSTON,
*Commissioner of Patents.*

Cl. 240—48.4.